3,125,856
Patented Mar. 24, 1964

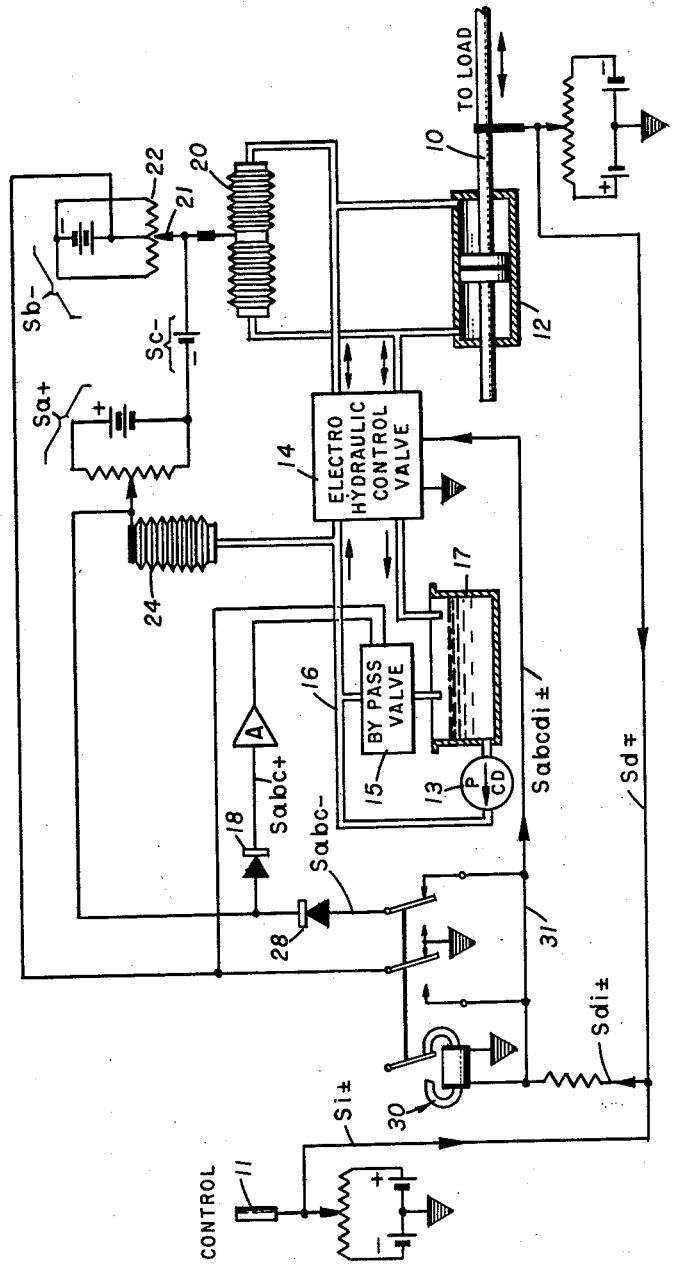

3,125,856
VARIABLE-PRESSURE HYDRAULIC
CONTROL SYSTEM
Orland D. Branson, Sunland, and Philip H. Bush, North Hollywood, Calif., assignors to The Bendix Corporation, North Hollywood, Calif., a corporation of Delaware
Filed June 4, 1962, Ser. No. 199,801
4 Claims. (Cl. 60—52)

This invention relates to electrohydraulic control systems in which a controlled member is driven by a hydraulic motor powered by pressure fluid from a source such as a constantly running pump, control being effected in response to electric signals by an electrohydraulic control valve positioned between the source and the hydraulic motor.

Such systems are broadly old, and conventionally the pressure source is of a type normally maintaining a predetermined high pressure, and the control valve, when open, throttles the flow to produce a motor movement of the desired rate. Under some conditions, the valve may open wide, delivering the full output of the pump to the motor, so that the pressure drop across the valve is low for a short time, but at many times the flow is highly throttled with resultant high pressure drop across the valve. This conventional type of system has the disadvantage that under throttling condition, with a high pressure drop across the control valve, objectionable noise may be generated. Another disadvantage is that a variable delivery pressure source must be employed, or excess high pressure fluid must be wasted by discharge through a relief valve, which itself could be a source of noise.

An object of the invention is to provide a practicable, silent electrohydraulic control system.

Another object is to provide such a system that is not subject to cavitation when the load on the controlled member is in aiding relation relative to a command signal applied to the system.

Other more specific objects and features of the invention will appear from the description to follow.

The first object, namely, silent operation, is attained in accordance with the invention by at all times limiting the pressure at the pump outlet to a value only slightly exceeding the absolute value of the pressure drop across the motor, which pressure drop is a function of the load magnitude. Therefore the pressure drop across the control valve is small, and throttling noises are substantially eliminated.

The pressure control is effected by a bypass valve connected in effect between the inlet and outlet of the pump and responsive to the differential between the absolute value of the pump output pressure and the pressure drop across the load motor to open and close as necessary. This enables use of a constant delivery pump, the second stated object of the invention.

The third stated object, prevention of cavitation, is attained by superimposing on the input signal (which is maintaining the control valve open) an opposing signal when the pump pressure fails to exceed the absolute value of the pressure drop across the load motor by a predetermined bias pressure.

A full understanding of the invention may be had from the following description with reference to the drawing, the single figure of which is a schematic diagram of a system incorporating the invention.

Referring to the drawing, the general purpose of this system is to move by hydraulic power a load-driving or output member 10 in accordance with the movement of a control member 11, while preventing the hydraulic pressure in the system from materially exceeding the value necessary to overcome the resistance of the load. The load-driving member 10 is shown as the piston rod of a hydraulic motor 12, which can be supplied with pressure fluid to move it in either direction from a constant delivery pump 13 through an electrohydraulic control valve 14 that is supplied with control current which is a function of the following:

(1) A D.C. input signal $S_{i\pm}$ variable over a continuous range between positive and negative limit values according to the position of the control member 11.

(2) A feedback signal $S_{d\mp}$ of opposite polarity and equal to the input signal $S_i$ when the output member 10 is in position corresponding to that of the input member 11.

(3) A positive signal $S_{a+}$ of magnitude proportional to the output pressure of the pump 13, which is the input pressure supplied through a line 16 to the control valve 14.

(4) A negative signal $S_{b-}$ of magnitude proportional to the absolute value of the pressure drop across the hydraulic motor 12 (which in turn is proportional to the load).

(5) A normally fixed negative bias signal $S_c$.

In order to limit the hydraulic pressure supplied by the pump 13 to the control valve 14 when the load force is positive, i.e., opposing the direction of movement, an electrohydraulic bypass or dump valve 15 is connected to the pump output line 16 for bypassing fluid directly therefrom to the sump 17. This bypass valve 15 is normally closed, but is capable of being variably opened by a signal $S_{abc}$ when the latter is of positive polarity, as by placing a suitably poled rectifier 18 in the line. The signal $S_{abc}$ is the sum of the positive signal $S_{a+}$ corresponding to the pressure in the line 16, the negative signal $S_{b-}$ corresponding to the absolute value of the pressure drop across the motor 12, and the fixed negative bias signal $S_{c-}$. The valve 15 therefore opens as necessary to prevent the pressure in the line 16 from exceeding that required to balance the load by more than the bias pressure corresponding to the bias voltage $S_{c-}$. Under these conditions the pressure drop across the servo valve 14, which corresponds to the bias voltage, is small, and noise is eliminated even though the load resistance may be very low. If the load force is high, the pressure drop across the motor 12 is high, causing the bellows 20 to shift the potentiometer contact 21 toward one end or the other of the potentiometer 22 and increase the magnitude of the negative signal $S_{b-}$, thereby reducing the magnitude of the positive signal $S_{abc+}$ and moving the bypass valve 15 in closing direction until the pressure rise in line 16 and bellows 24 increases the signal $S_{a+}$ to match the sum of the load signal $S_{b-}$ and the bias signal $S_{c-}$.

Therefore, in response to a suddenly applied input signal $S_i$ tending to actuate the motor 12 in opposition to the load resistance, the system functions (by controlling the bypass valve 15) to maintain the pressure in the line 16 only slightly greater than the load pressure, the control valve 14 opens widely, and the pressure drop across it is small, eliminating high pressure throttling noises.

However, a problem develops when the input signal, instead of being opposed by the load, is aided by a large load force. If the aiding load force is high enough it will attempt to draw so much fluid (through the open control valve) that the pump pressure is reduced to such an extent that destructive cavitation can occur. In accordance with this invention, such cavitation is prevented by partially closing the control valve 14 to throttle the return flow from the motor 12 to the sump 17 sufficiently to reduce the velocity of the motor to the point where its fluid demand does not produce cavitation. Such partial closing of the control valve 14 is accomplished as follows:

With a large aiding load, when the control valve 14 is open the load motor 12 moves rapidly, $S_{a+}$ is low, and $S_{b-}$ is high, so that the sum potential $S_{abc}$ is negative and cannot pass the rectifier 18 to open the bypass valve 15. However, it can pass an oppositely poled rectifier 28 and be applied through the contacts of a polarity-reversing polar relay 30 to the line 31 leading to the control valve 14. The relay 30 is actuated by the sum signal $S_{di}$ and responds to the polarity of the latter to determine the polarity of application of the signal $S_{abc-}$ to the control valve 14 and thereby tend to close the valve in the following manner:

(1) The signal $S_{di}$ may be either positive or negative, depending only upon the direction in which the motor 12 is to be moved.

(2) Always, under aiding load conditions, during movement in either direction $S_{b-}$ is larger than $S_{a+}$, so that $S_{abc}$ is negative but is applied by the polarity-inverting polar relay 30 to the line 31 as either a positive or a negative potential.

(3) The winding of the polar relay 30 is so connected to the line 31 as to respond to either polarity thereon to apply the signal $S_{abc}$ thereto in opposite polarity and reduce the opening of the control valve 14, developing a greater pressure drop thereacross. This increases the resistance to return flow of fluid from the motor 12 to the sump 17, slowing the motor and reducing the demand of the motor to or below the pump capacity, thereby preventing cavitation.

Considering a specific example: assume that at a given instant the load is positive, and the system is in equilibrium with an input signal $S_i$ of $+1$. Since the system is in equilibrium, the feedback signal $S_d$ is $-1$, neutralizing the input signal and closing the control valve 14. Since valve 14 is closed, the pump output pressure signals $S_{a+}$ exceeds the load pressure signal $S_{b-}$ by the bias signal $S_{c-}$, and no signal is applied through rectifier 28 to line 31.

If the positive load force increases, signal $S_{b-}$ increases, which drives the signal $S_{abc+}$ less positive whereby the bypass valve 15 is moved in closing direction to correspondingly increase the pressure in line 16 to match the increased load pressure.

If the load force reverses in direction, the same effect results so long as the control valve 14 remains closed, because signal $S_b$ is always negative regardless of the direction of pressure drop across the motor 12. However, now assume that control signal $S_i$ builds up toward $+2$ and that the resultant signal $S_{di}$ opens the control valve 14 in direction to drive the motor 12 in the same direction in which it is being urged by the load. Since the valve 14 is purposely made sensitive to open widely in response to a fast signal, the negative pressure of the motor 12 produced by the aiding load force immediately reduces the pressure in line 16, and hence the magnitude of the positive signal $S_{a+}$, and drives the sum signal $S_{abc}$ negative. This closes the bypass valve 15 if it was not already closed, but the pressure in line 16 and bellows 24 is not sufficiently increased by such closure. The negative signal $S_{b-}$ is not materially reduced by the opening of the valve 14. The overall result is that the signal $S_{abc}$ goes negative and is applied through the rectifier 28 and the contacts of the relay 30 to the line 31 in opposition to the signal $S_{di}$ as previously described. The valve 14 therefore moves in closing direction, increasing the pressure drop thereacross and thus increasing the pump output pressure to a value sufficient to prevent cavitation in the motor lines.

Under aiding load conditions that would produce cavitation in a normal system, $S_{a+}$ (a function of the pump pressure) is very low, and $S_{b-}$ (a function of the load pressure) is very large. Assuming $S_{a+}$ to be 0, the sum of $S_{b-}$ and $S_{c-}$ moves the control valve 14 in a closing direction and raises the pump pressure and $S_{a+}$.

The feedback signal, $$S_{a+} + S_{b-} + S_{c-} = S_{abc-}$$

is opposing the input signal $S_i$ (which opened the valve) and is initially large, tending to move the valve rapidly in closing direction, thereby rapidly increasing the pump pressure signal $S_{a+}$ and causing the signal $S_{abc-}$ to become less negative until a condition of equilibrium is reached in which the absolute value of the pump pressure is only slightly less than that of the load pressure signal, and both are in aiding relation to each other with respect to flow through the control valve, requiring a much smaller opening of the valve 14 (to produce the same flow) than when the load is opposing the input signal.

The pump pressure sufficient to prevent cavitation corresponds approximately to the absolute value of the load pressure. As previously indicated, normally (with an opposing load) the pressure drop across the valve 14 corresponds to the value of the electrical bias signal $S_{c-}$.

During operation of the motor 12 under aiding load conditions, the pump pressure exceeds the absolute value of the load pressure by approximately two times the fixed bias pressure.

The control valve 14 may be of the reversible servo type, one example of which is shown in D. V. Healy Patent No. 2,827,067. Such valves independently meter flow to one port of a motor and from the other port of the motor. The opening of such servo valves is proportional to the electrical potential applied thereto, so that a similar valve may be used as the bypass valve 15.

Although for the purpose of explaining the invention a particular embodiment thereof has been shown and described, obvious modifications will occur to a person skilled in the art, and we do not desire to be limited to the exact details shown and described.

We claim:

1. A hydraulic system for moving a load member in response to electrical input signals, said system comprising:
   a reversible hydraulic motor connected to said load member;
   a source of pressure fluid and connecting means including an electrically-actuated control valve for providing a variable-flow resistance path between said source and motor;
   an electrically-actuated bypass valve connected to said source for controllably bypassing fluid to vary the output pressure of the pump;
   pump-pressure signal means connected to said pump for producing an electrical pump-pressure signal proportional to the pump output presssure;
   motor-pressure signal means connected to said motor for producing an electrical motor-pressure signal proportional to the absolute value of the pressure drop across the motor;
   means for applying said input signal to said control valve to reduce the flow resistance from said pump to said motor; and
   means for applying pump-pressure signals exceeding said motor-pressure signals by a predetermined margin to said bypass valve to reduce said pump output pressure.

2. Apparatus according to claim 1 in which said last-mentioned means includes means providing a bias signal of value corresponding to said predetermined margin in aiding relation to said motor-pressure signal.

3. Apparatus according to claim 2 including:
   means for producing a sum signal equal to the sum of the absolute values of said motor pressure signal and said bias signal;
   and means for comparing said sum signal with said pump-pressure signal and applying any excess of sum signal over pump-pressure signal to said control valve in opposition to said input signal, to increase the flow resistance of said control valve.

4. Apparatus in accordance with claim 3 in which:
   said pump-pressure signal is always of one polarity and said sum signal is of opposite polarity;

said control valve is responsive to signals of either polarity;

said means for applying pump-pressure signals exceeding motor pressure signals to said bypass valve comprising first polarity-responsive means responsive to a resultant signal of said one polarity for applying said resultant signal to said bypass valve;

said means for applying an excess of sum signal over pump pressure signal to said control valve in opposition to said input signal comprising second polarity-responsive means responsive to said opposite polarity for applying said resultant signal to a separate circuit;

and means responsive to the polarity of the input signal applied to said control valve for connecting said separate circuit to said control valve in opposing relation to said input signal.

References Cited in the file of this patent
UNITED STATES PATENTS

| | | |
|---|---|---|
| 2,188,834 | Fischel | Jan. 30, 1940 |
| 2,413,907 | Brant | Jan. 7, 1947 |
| 2,812,026 | Braddon | Nov. 5, 1957 |
| 3,038,451 | Sporn | June 12, 1962 |